Aug. 19, 1952   W. SCHRÖDER ET AL   2,607,099
METHOD AND APPARATUS FOR MOLDING REINFORCED CONCRETE ELEMENTS
Filed Nov. 30, 1950   2 SHEETS—SHEET 1
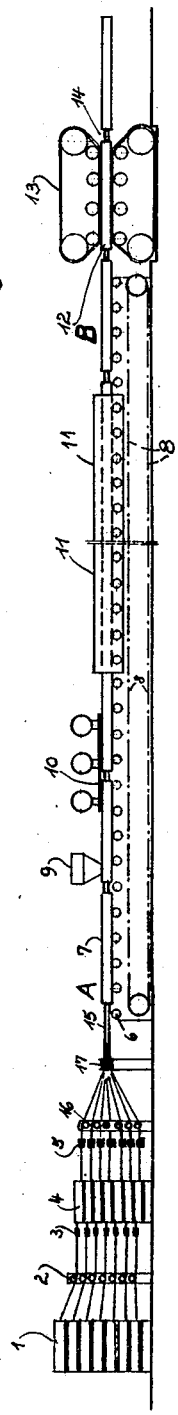
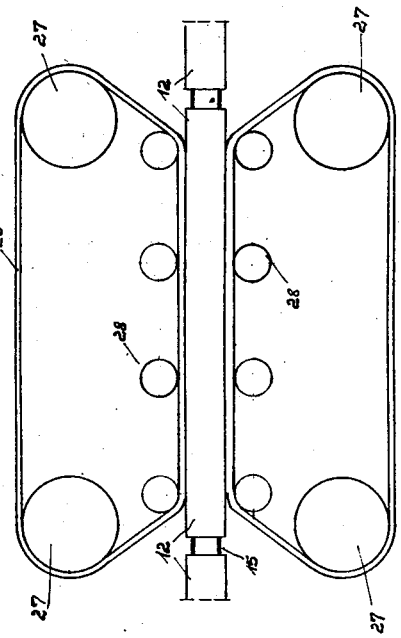
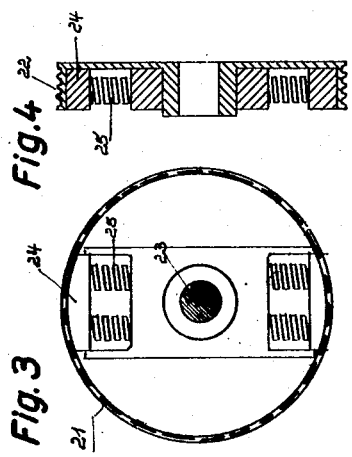
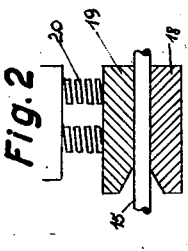
Inventors
Werner Schröder and
Rolf Bönninghaus
by Aug. 19, 1952   W. SCHRÖDER ET AL   2,607,099
METHOD AND APPARATUS FOR MOLDING REINFORCED CONCRETE ELEMENTS
Filed Nov. 30, 1950   2 SHEETS—SHEET 2
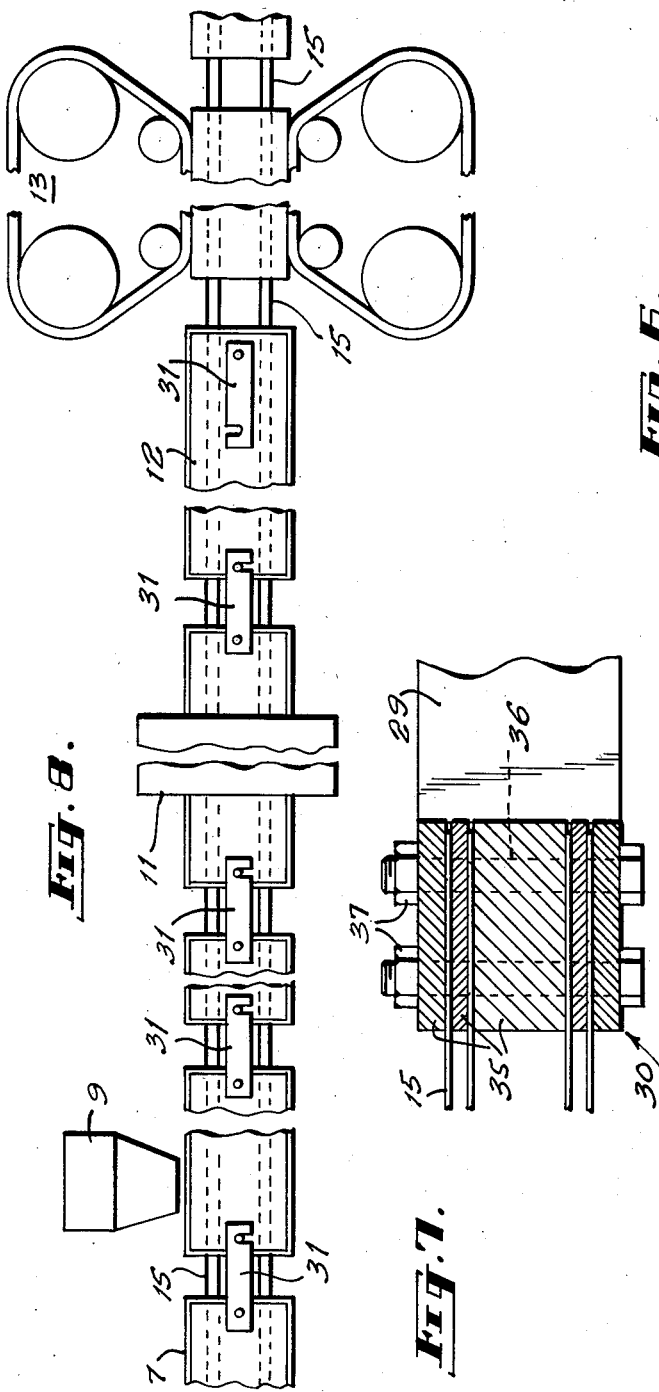
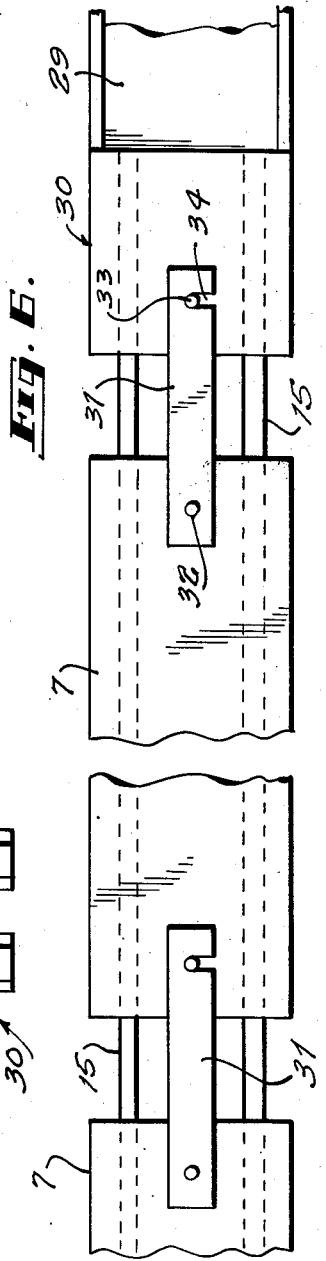
INVENTORS
WERNER SCHRÖDER
ROLF BÖNNINGHAUS
BY Patented Aug. 19, 1952

2,607,099

UNITED STATES PATENT OFFICE 2,607,099

METHOD AND APPARATUS FOR MOLDING REINFORCED CONCRETE ELEMENTS

Werner Schröder, Dusseldorf, and Rolf Bönninghaus, Hamm, Westphalia, Germany

Application November 30, 1950, Serial No. 198,292
In Germany October 1, 1948

13 Claims. (Cl. 25—41)

The present invention relates to improvements in the manufacture of concrete elements reinforced with pretensioned metal reinforcement.

The invention relates to a method and apparatus for the manufacture of pre-tensioned steel reinforced finished units, such for example as building slabs, props, beams, joists, columns, boxes, piles, railway sleepers or the like.

An object of the invention is to provide means whereby the manufacture may take place continuously on a moving conveyor.

It is not at the present time a novel idea to produce continuously pre-stressed ferro-concrete parts as an alternative to the lengthy and costly and very inefficient production of such parts individually. Insuperable difficulties have, however, attended the carrying out of such a continuous operation in which the progressive forward movement of a casting or mould box filled with fresh concrete on a conveyor band has not avoided a displacement of the wires embedded in the concrete. A completely progressive and uniform displacement of a conveyor band supporting the mould boxes and the tensioned wires cannot in practice be obtained. It is also not possible to arrange that two wholly different conveying machines operate in complete synchronism. There is, moreover, the necessity to overcome the great difficulty that the arrangement for tensioning the steel wires and the power drive for the transporting conveyor must be separately operated. With the very smallest lack of synchronism, a displacement of the steel wires embedded in the fresh concrete takes place, so that securing of these in the hardened concrete is disturbed.

All these disadvantages are overcome by the present invention, in that the tensioning of the thin steel wires passed through the mould boxes filled, or to be filled, with fresh concrete and releasably coupled end to end in a string, and the forward movement of such mould boxes, is effected from the solidified concrete at the end of the string of boxes.

The simultaneous and uniform movement of the mould boxes filled with fresh concrete, together with the tensioned steel wires embedded in the fresh concrete, without a slipping of one relatively to the other, is effected, according to the invention, in that between the feeding drum which pays out the wires, and the driving conveyor device which draws the boxes an anti-friction track is provided, instead of the usual transporting conveyor, on which the collapsible mould boxes coupled end to end in a string move in sequence past filling and shaking machines and, in certain cases, through a heating tunnel, after which the fully hardened concrete articles are freed from the mould boxes which are made from a number of pieces, and are taken up by the conveyor device and conveyed thereby further onwards, so that the steel wires passing through the whole length of the sequence of mould boxes are maintained tensioned in the hardened concrete finished parts and are displaced with them.

At the beginning of the final steps of the process according to the present invention, instead of detachably coupling the string of mould boxes, iron carriers or the like may be used, the last one of which is connected to the steel wires by an appropriate head-pieces, these carriers at the other end of the string of mould boxes being freed from the string as they pass the conveyor device.

The conveyor device is so formed, according to the present invention, that at the commencement of the finishing processes it operates directly on the carriers, and during the finishing processes it operates directly on the finished concrete articles, and, moreover, quite independently of the shape and mass of these, so that in the first place the pre-stressed steel wires are tensioned by the carriers, and taken along with these, whilst in the second place the displacement of the steel wires is effected by reason of their combination with the already hardened mass of concrete. In this manner it is possible for the steel wires to accompany the movement of the mould boxes, filled with fresh concrete, on the anti-friction track without risk of the steel wires becoming displaced in the fresh concrete. By this means the continuous manufacture of concrete articles having pre-tensioned steel wires embedded in them becomes possible, with a saving of time and with a saving of additional conveying apparatus for the anti-friction track and for the steel wires, as also for the mould boxes.

The invention is further described with reference to the accompanying drawing, in which:

Fig. 1 is a diagrammatic view of a complete arrangement for the continuous manufacture of finished concrete articles according to the invention, Fig. 2 shows the steel wire clamping device in sectional elevation, Fig. 3 is a view of the tensioning brake in sectional elevation, Fig. 4 is a view corresponding to Fig. 3 in longitudinal section, Fig. 5 is a diagram of the conveyor device.

Fig. 6 is a diagrammatic view of the mould boxes coupled to a head piece;

Fig. 7 is a sectional elevation of a head piece; and

Fig. 8 shows a diagrammatic view of a string of mould boxes in the concrete forming process.

The drawing shows a feeding drum or frame 1, which is preferably so arranged that the desired number of steel wires 15 can be taken up upon it in individual windings or coils. The steel wires 15 are drawn from the feeding drum 1 at constant speed through operation of a driving conveyor device 13 and are retarded through said conveyor device acting against the effect of wire clamps 3 and a tension brake 4, so that the desired tension is obtained in the individual wires. Tension meters 5 serve to control the tension of these wires. Roller guides 2, 16 and 17 serve to guide the steel wires.

The wires 15 fed from the feeding drum 1 are so guided by a reverse guide arrangement of roller guide 2 that they run at right angles to the tension brake 4, so that slipping of the wires on this tension brake through the wire clamp 3 disposed in front of it is prevented. This clamp 3, as shown in Fig. 2, is preferably formed of two clamping jaws 18 and 19, of which the jaw 18 is fixed whilst the jaw 19 is movable and is thrust towards the steel wire sliding on the fixed jaw 18 by means of springs 20. The two jaws 18 and 19 are mounted parallel to one another, and are so formed that they may lift relatively to one another at the entry end for the wire, so that any connections between two ends of wire lengths may pass freely through the wire clamp.

The tensioning brake (see Figs. 3 and 4) preferably consist of a drum 21 which has a groove 22 for the accommodation of each steel wire 15. In the arrangement illustrated five are shown, by way of example. The drum 21 is rotatable about a fixed axis 23 and is braked by the operation of adjustable springs 25 which press brake shoes 24 against the interior periphery of drum 21.

An anti-friction roller track is indicated at 6 and is adapted to transport collapsible mould boxes 7 towards the conveyor device 13. Said mould boxes 7 which receive the fresh concrete, each consist of a number of parts which may be readily dismantled and assembled. The mould boxes 7 are placed on the track 6 at the point A and form a continuous string extending as far as the transporter conveyor, so that the individual boxes are securely coupled together. These mould boxes pass in sequence on their way towards the conveyor device 13 under a filling machine 9, a shaking device 10 and a heating tunnel 11 in which the fresh concrete becomes set. Due to the hardening of the concrete, the steel wires 15 remain firmly secured in the concrete. Their rigidity therein is such that after the dismantling of the parts forming the mould boxes 7, when these have left the heating tunnel 11, the complete string of boxes 7 following on from the cast articles 12 are only connected by the steel wires 15, which can then take the whole tension.

The conveyor device 13 preferably consists, as is shown in Fig. 5, of two endless friction belts 26, which are guided by the driving rollers 27 and are under spring tension by means of rollers 28. If desired, a number of fixed rollers may be used instead of the lower friction band drive. The cast articles 12, passing between the two friction bands 26, are carried along with these as they are driven, so that the whole string of boxes is set in movement, which simplifies the arrangement of the roller track 6. To relieve the conveyor device 13 of load, it will be preferable to arrange the roller track 6 on a slight incline.

The mould boxes 7 released from the cast articles 12 prior to the latter passing the conveyor device 13, are taken back under or adjacent to the roller track 6 by way of an endless travelling conveyor 8 which brings the discarded boxes back to the commencement of the string, so that they can be freshly assembled again.

In order to start a continuous forward movement, the roller track 6, of any suitable length, may be associated with individually coupled or screwed together iron T carrier pieces 29 which are 10 to 12 ft. long, or alternatively to concrete bodies of equal or similar size, and in such manner that the string commences at A and ends with the last piece at the conveyor device. The first piece at A will have a special head-piece 30 (Figs. 6 and 7) upon it to which the appropriate number of steel wires 15 can be firmly secured. The head piece 30 may comprise, by example, a plurality of horizontally disposed parallel plates 35 between which the wires 15 are clamped by means of crosswise extending screwbolts 36 which are tightened by nuts 37.

The conveyor device 13, the speed of which can be adjustable in steps, is set in motion and drives the string of carriers by tensioning the steel wires. When the desired tension (pre-tensioning) is reached, the tensioned brake is automatically released and the whole string moves forward at the predetermined speed. The individually connected carrier pieces then roll along the roller track 6.

If the head of the string of carriers is moved along the roller track as far as the length corresponding to the concrete element 12, then a first mould box 7 is put into position and connected to the head-piece of the moving string by means of a releasable coupling member 31 (Fig. 6) so that it takes up the forward movement. In a similar manner the second and third mould boxes, and so forth, are put into position and coupled up by similar coupling members 31 (Fig. 8). The mould boxes then pass under the filling machine 9 where they are filled automatically with fresh concrete, either as they move progressively forward or during a thrust as they pass through the shaking device 10 which settles the concrete. They again come into the heating tunnel 11, which consists of a pre-heating, a heating and a cooling zone. The length of this heating tunnel is so chosen that the concrete, after leaving this zone, has received the necessary rigidity by the action of the heat (steam) applied to it.

When the boxes emerge from the heating tunnel with the element contained therein set, the boxes are uncoupled and dismantled. The parts of the moulding boxes are removed, cleaned, and are returned to the point A by means of the conveyor 8, as previously described.

The appropriate mould boxes are put together at the place A, continue as a string of T carriers 29, and pass to the conveyor device 13, the individual parts being picked up at 14 and laid to one side. After the last carrier piece has come through, the first finished coupled cast article 12 will follow through the conveyor device and takes over the function of drawing the following string with it. Thus, the start of the continuous process by means of the T-carriers 29 is complete and the leading cast article 12 assumes the function of tensioning the wires 15.

Immediately the first cast article 12 has left the conveyor device, the wires 15 are separated at the place 14, so that the cast article is free to be transported elsewhere. This is then taken away and put into store. The drive then continues without interruption. The lengths of wires stored on and run off the feeding drum 1 are joined on to new lengths as required by known methods, for example pleating or "marrying" so that the joint is able to pass through the clamp by forcing the jaws apart.

The method of continuously manufacturing concrete elements as pre-tensioned steel reinforced units consists of tensioning steel wires and then forming the concrete elements in a continuous string around them. The concrete is allowed to harden fully before the tensioning force, which is produced according to the invention by acting upon an already hardened concrete element at the end of the string, is removed. This force which acts in cooperation with a tension brake to give the required amount of tensioning in the steel wires, also provides the continuous motion of the elements, as they move through the various stages of formation in moulding boxes, shaking and heating.

While we have disclosed one embodiment of the present invention, it is to be understood that this embodiment is given by example only and not in a limiting sense, the scope of the invention being determined by the objects and the claims.

We claim:

1. A method for the continuous manufacture of concrete and like articles reinforced with pre-tensioned steel wires by means of a plurality of mould boxes detachably coupled together endwise in series, comprising the steps of passing the said steel wires through the series of mould boxes, tensioning the said wires, filling a plurality of the said mould boxes with concrete, shaking the said mould boxes, solidifying the concrete in the said mould boxes, advancing the mould boxes for the said filling, shaking and solidifying operations, and effecting the advancement of the said mould boxes through the medium of the solidified concrete at the leading end of the series of mould boxes.

2. A method for the continuous manufacture of concrete and like articles with pre-tensioned metallic reinforcement wires by means of a plurality of collapsible mould boxes detachably coupled together endwise in series, comprising the steps of drawing the said wires from the source of supply against braking resistance through the said plurality of mould boxes thus tensioning the said wires passing through the said mould boxes, anchoring the said wires to the leading one of the series of concrete, the latter being in a solidified state, successively filling, shaking and solidifying the concrete in the said mould boxes, and progressing the said mould boxes by a pull applied to the said leading solidified concrete, said pull being sufficient to overcome the said braking resistance.

3. A method for the continuous manufacture of concrete and like articles with pre-tensioned metallic reinforcement wires, comprising the steps of detachably coupling together endwise in series a plurality of mould boxes to be filled with concrete, passing the said wires through the said series of mould boxes, tensioning the said wires passing through the said mould boxes, advancing the said mould boxes, filling, shaking and solidifying the concrete in the said mould boxes and effecting the advancement of the said mould boxes through the medium of the solidified concrete at the leading end of the said series of mould boxes.

4. A method for the continuous manufacture of concrete and like articles with pre-tensioned metallic reinforcement wires by means of a plurality of mould boxes detachably coupled together endwise in series, comprising the steps of drawing the said wires from a source of supply against braking resistance through the said series of collapsible mould boxes, anchoring the said wires to a leading mould box, successively filling, shaking and solidifying the concrete in the mould boxes, and tensioning the wires passing through the said mould boxes and progressing the said mould boxes by a continuous pull applied to the solidified concrete of the leading mould box, said pull being sufficient to overcome the said braking resistance.

5. Apparatus for the continuous manufacture of concrete and like articles with pre-tensioned metallic reinforcement wires, comprising in combination a holder for carrying the wire supply, a conveyor device, a roller track disposed between the said wire holder and said conveyor device, a plurality of collapsible mould boxes adapted to be coupled together endwise in series and pulled along said roller track, means for anchoring the end of the said wires to the leading mould box when the wires have been drawn through the said series of mould boxes, a filling device, a shaking device and a heating tunnel whereby the mould boxes during their passage along said roller track are successively filled, the contents compacted, and finally solidified, the tensioning of the reinforcing wire passing through the series of mould boxes and also the progression thereof along said roller track being effected by a pulling action applied to the solidified concrete of the leading mould box by said conveyor device.

6. Apparatus for the continuous manufacture of concrete and like articles with pre-tensioned metallic reinforcement wires, comprising in combination a holder for carrying the wire supply in separate coils, means to draw the said wires from the said holder, a conveyor device included in the said drawing means, a roller track disposed between the said wire holder and said conveyor device, a plurality of collapsible mould boxes adapted to be coupled together endwise in series for movement along said roller track, means for anchoring the end of the said wires to the leading mould box when the said wires have been drawn through the series of mould boxes, a filling device, a shaking device and a heating tunnel whereby the mould boxes during their passage along said roller track are successively filled, the contents compacted, and finally solidified, the tensioning of the said reinforcing wires passing through the said series of mould boxes and also the progression thereof along said roller track being effected by a pulling action applied to the solidified concrete of the leading mould box by said conveyor device.

7. Apparatus for the continuous manufacture of concrete and like articles with pre-tensioned metallic reinforcement wires, comprising in combination a holder for carrying the said wire supply in separate coils, means to draw the said wires from the said holder, clamping means for the said wires, a tension brake operating in conjunction with said clamping means to apply the desired tension to the wires, a conveyor device included in the said drawing means, a roller track disposed between the wire holder and conveyor device, a plurality of collapsible mould boxes adapted to be coupled together endwise in series for movement along said roller track, means for anchoring the end of the said wires to the leading mould box when the wires have been drawn through the said series of mould boxes, a filling device, a shaking device and a heating tunnel whereby the mould boxes during their passage along said roller track are successively filled, the contents compacted, and finally solidified, the tensioning of the said reinforcing wires passing through the series of mould boxes and also the progression thereof along said roller track being effected by a continuous pulling action applied to the solidified concrete of the leading mould box by said conveyor device.

8. In an apparatus for the continuous manufacture of concrete and like articles with pre-tensioned metallic reinforcement wires, a holder for carrying the wire supply, a conveyor device, a roller track disposed between the said holder and the said conveyor device, a filling device, a shaking device and a heating tunnel disposed successively above the said roller track, a series of mould boxes coupled together as a continuous string adapted to be passed in sequence past the said filling and shaking device and through the said heating tunnel.

9. The apparatus, as set forth in claim 5, in which the said roller track between the said holder for the wire supply and the said conveyor device is arranged on an incline so as to relieve the said conveyor device of undue load.

10. The apparatus, as set forth in claim 7, in which the said tension brake has jaws engaging the wires and is disposed immediately following the said holder carrying the wire supply.

11. The apparatus for the continuous manufacture of concrete and like articles reinforced with pre-tensioned metallic wires, comprising a feed wire holder and means for tensioning the said wires, a roller track disposed between the said wire holder and the said tensioning means, a plurality of mould boxes disposed along the said roller track and adapted to be filled with concrete, means for detachably coupling together endwise in series the said mould boxes, the said mould boxes receiving the said tensioned wires, means for filling, shaking and solidifying the concrete poured into the said mould boxes, and the said last-mentioned means being disposed in sequence above the said roller track.

12. The apparatus for the continuous manufacture of concrete and like articles with pre-tensioned steel wires, as set forth in claim 11, in which the said tensioning means for the said wires include means for drawing the said wires from a source of supply through the said mould boxes, means disposed in front of the said roller track for providing braking resistance for the feeding of the said wires, means for anchoring the said wires to the leading one of the said mould boxes, and pulling means secured to the said leading mould boxes for progressing the said plurality of mould boxes, said pulling means exerting a greater force than that of the said braking resistance means.

13. The apparatus for the continuous manufacture of concrete or like articles with pre-tensioned steel wires, as set forth in claim 11, which includes means for anchoring the said wires to the leading one of the said mould boxes.

WERNER SCHRÖDER.
ROLF BÖNNINGHAUS.

REFERENCES CITED

The following references are of record in the file of this patent:

UNITED STATES PATENTS

| Number | Name | Date |
| --- | --- | --- |
| 1,920,716 | Schafer | Aug. 1, 1933 |
| 2,394,227 | Barber | Feb. 5, 1946 |